Sept. 20, 1938.  F. A. MAGINNIS  2,130,430
AIR FLOW VENTILATING, HEATING, COOLING, HUMIDIFYING,
GASSING CONTROL TRANSPORT SYSTEM
Filed Aug. 28, 1936  6 Sheets-Sheet 1
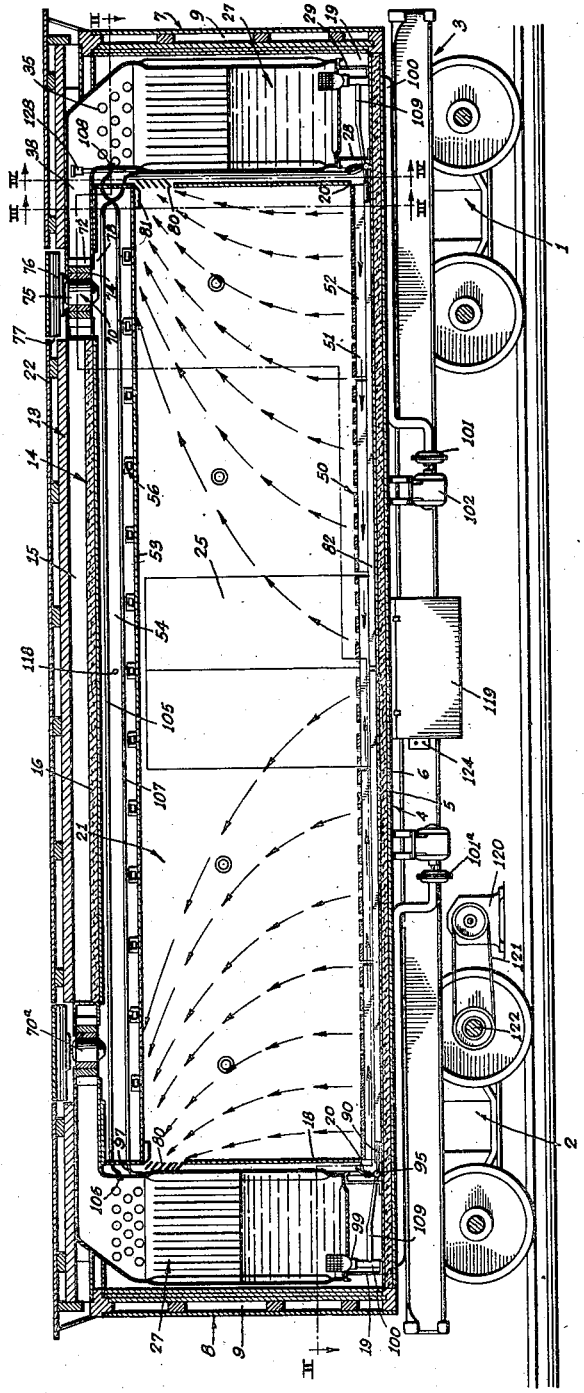
INVENTOR.
FRANK A. MAGINNIS
BY
Lyon+Lyon
ATTORNEY.

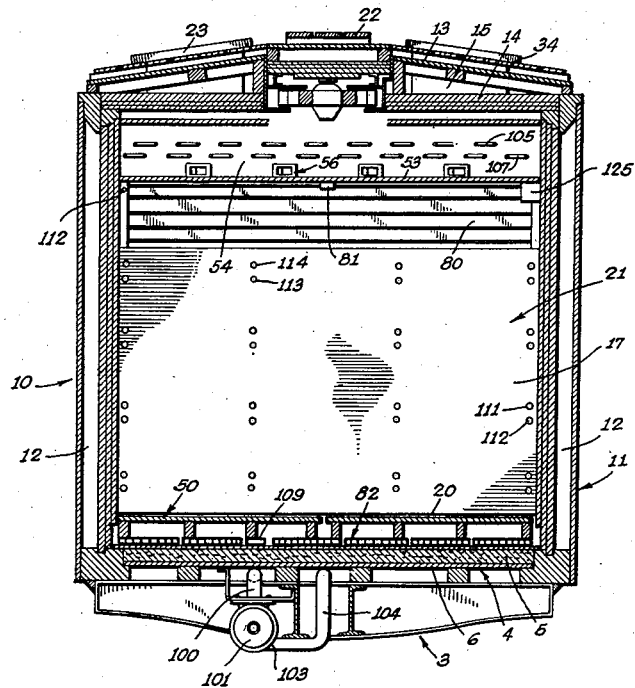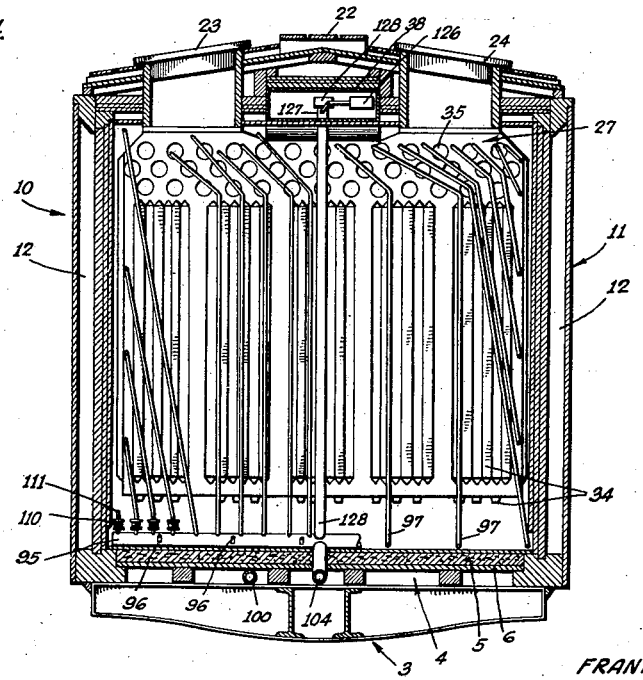

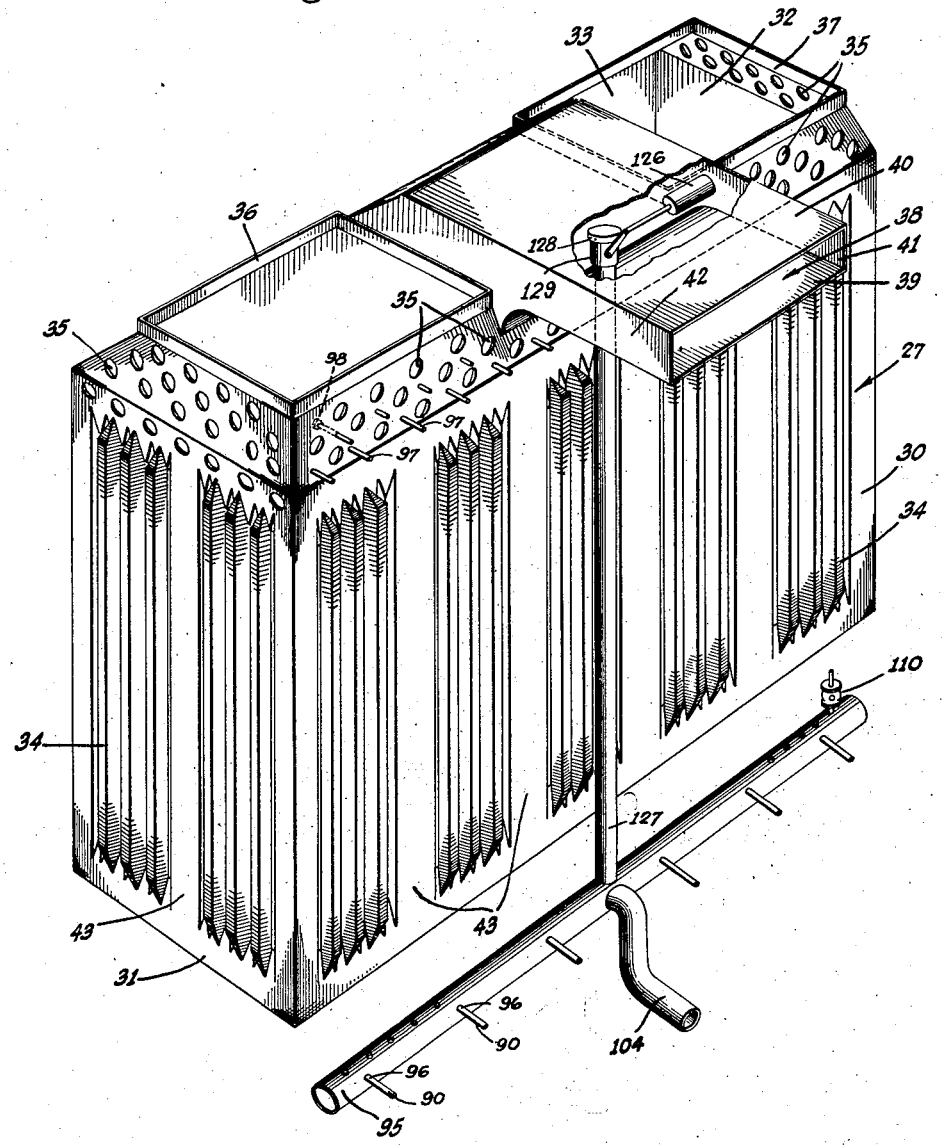

Sept. 20, 1938.  F. A. MAGINNIS  2,130,430
AIR FLOW VENTILATING, HEATING, COOLING, HUMIDIFYING,
GASSING CONTROL TRANSPORT SYSTEM
Filed Aug. 28, 1936  6 Sheets-Sheet 4

INVENTOR.
FRANK A. MAGINNIS

BY

ATTORNEY.

INVENTOR.
FRANK A. MAGINNIS

BY Lyon & Lyon

ATTORNEY.

UNITED STATES PATENT OFFICE 2,130,430

AIR FLOW VENTILATING, HEATING, COOLING, HUMIDIFYING, GASSING CONTROL TRANSPORT SYSTEM

Frank A. Maginnis, Los Angeles, Calif., assignor to John F. Daly, Alhambra, Calif.

Application August 28, 1936, Serial No. 98,294

16 Claims. (Cl. 62—24)

My invention relates to transport systems for the transportation of fruits, vegetables, meats, or other fresh products requiring regulation as to ventilation, heating, cooling, humidifying, gas treating and gas distribution for the proper preservation of the products during shipment, and has particular reference to an arrangement of a vehicle adapted to meet substantially all of the requirements of transportation of any of such products.

The present practice of transporting perishable products consists in packing the products in suitable vehicles, such as railroad cars, trucks or ships, which are provided with apparatus for cooling, heating or ventilating the load in an attempt to produce and maintain the desired temperature and atmospheric conditions within the load found to be more desirable, or selected by the shipper in accordance with the class of service he desires his shipment to receive.

For example, standard railroad refrigerator cars are employed which include a suitable insulated body within which is arranged a loading space and at each end of the car is provided a bulk-head spaced from the end of the car to provide appropriate space for the location of bunkers in which ice may be placed to cool the car, or heaters may be placed to heat the car. The distribution of the heat or refrigeration is accomplished by thermal circulation of the air within the car, that is, in cooling service, air passing over the ice will enter the loading space of the car below the bulkhead and will pass up through the load and along the ceiling of the car, returning to the bunker for re-cooling. In heating service the air travels over the heater in the reverse direction from cooling service.

It has been found that such thermal circulation is unsatisfactory for the proper cooling or heating of the entire load, since the air passing up or down through the load will take the shortest path back to the ice bunkers or heaters and that that portion of the load located near the center of the car will receive little or no effect from the refrigeration or heat.

Different types of produce require different conditions of heat or refrigeration or atmospheric conditions during transport for the proper preservation of the products. For example, citrus fruits are found to be more attractive and undergo less shrinkage if the fruit is pre-cooled or has the temperature thereof reduced to a relatively low value prior to the start of its journey, and various methods and apparatus have been used to pre-cool the air and the load for this purpose.

Such pre-cooling may consist of (a), pre-icing, or the loading of the ice bunkers in the car with ice prior to the introduction of the load; (b), the circulation of cold air by forced draft from the ice bunkers after the load has been placed in the cars; or, (c), forcing cold air through the car from a source independent of the ice bunkers within the car. All of these processes require the use of expensive refrigeration and further require considerable periods of time for treatment of the load prior to the release of the car for its actual journey to its destination.

Other types of produce require a temperature below the freezing point, such as meats, fish or frozen fruit juices, and for this purpose special cars are required equipped with special refrigeration apparatus capable of producing and maintaining the necessary low temperatures.

Other types of produce require the maintenance of a predetermined moisture content in the air to prevent undue shrinkage in the product during shipment.

All of the various conditional requirements of the various types of produce to be transported require special apparatus in addition to the normal standard refrigerator car construction.

It is an object of my invention to provide a new standard refrigerator vehicle which carries as standard equipment any or all of the apparatus necessary to meet any or all of the conditions required for the transportation of different types of products, and for the achievement of different classes of refrigeration, heating, ventilation, gassing and other services desired by the shipper.

Another object of the invention is to provide a produce transport vehicle which carries as standard equipment any or all of the apparatus required to achieve the various classes of refrigeration, heating, gassing, or other services, and capable of achieving these services during actual transit of the vehicle, rendering it unnecessary to delay the starting of the vehicle upon its journey after it has received its load.

Another object of the invention is to provide a transport vehicle of the character set forth, wherein a bunker of a new and novel type may be employed to receive any of the standard types of refrigeration or heating media now in general use in refrigeration transport service, such as ice, ice and salt, liquid refrigerant, mechanical refrigeration equipment, or heating equipment, and in which any of said refrigeration or heating materials and equipment may be used interchangeably without the alteration of the bunker construction.

Another object of the invention is to provide a vehicle of the character described with bunker mechanism as set forth in the preceding paragraph, in which at least a portion of the refrigeration or heating equipment will include a liquid and in which apparatus is employed for transporting a portion of said liquid below the load or over the load or between the portions of the load, or any combination thereof, to distribute the refrigerant more intimately with the load.

Another object of the invention is to provide a vehicle of the character set forth, in which the floor of the vehicle is adapted to distribute air substantially evenly throughout the load.

Another object of the invention is to provide a vehicle of the character set forth in which an auxiliary or false ceiling is employed to form an air passage for the return of air to the bunkers, and which is provided with means for regulating and controlling the distribution of the air throughout the load.

Another object of the invention is to provide a refrigerated vehicle of the character set forth in the preceding paragraph, wherein air may be circulated through the car under pressure to more effectively regulate the even distribution of the temperature-regulating effect of the air throughout the load.

Other objects and advantages will be apparent from a study of the following specifications, read in connection with the accompanying drawings, wherein I have illustrated my invention as adapted to a railroad car, though it will be understood that the principles illustrated and described herein are equally adaptable to trucks, ships, or other produce-transporting vehicles, and wherein Figure 1 is a vertical longitudinal sectional view, taken through a railroad car equipped with the apparatus of my invention;

Fig. 2 is a horizontal longitudinal sectional view, taken through the railroad car illustrated in Fig. 1, said section being made along lines II—II of Fig. 1;

Fig. 3 is a lateral vertical sectional view of the car shown in Fig. 1, taken along line III—III of Fig. 1;

Fig. 4 is a lateral vertical sectional view of the car shown in Fig. 1, taken along line IV—IV of Fig. 1;

Fig. 5 is a perspective view of the bunker illustrated in Figs. 1, 2 and 4;

Figure 9:
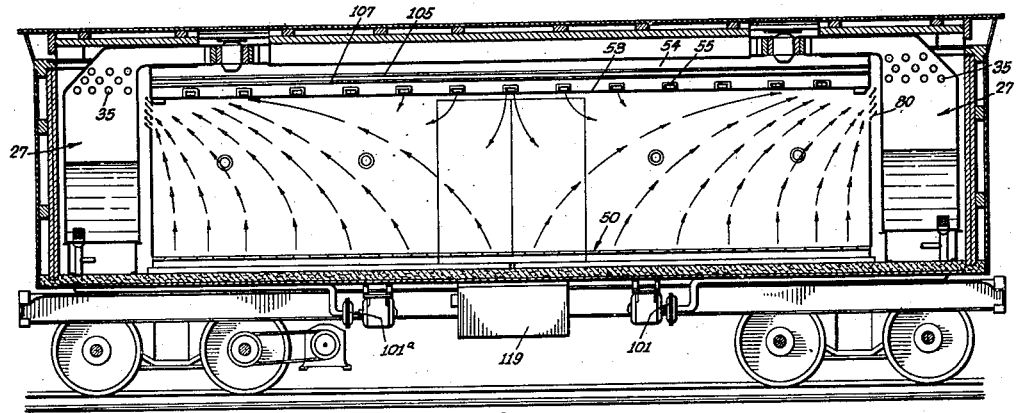
Figure 10:
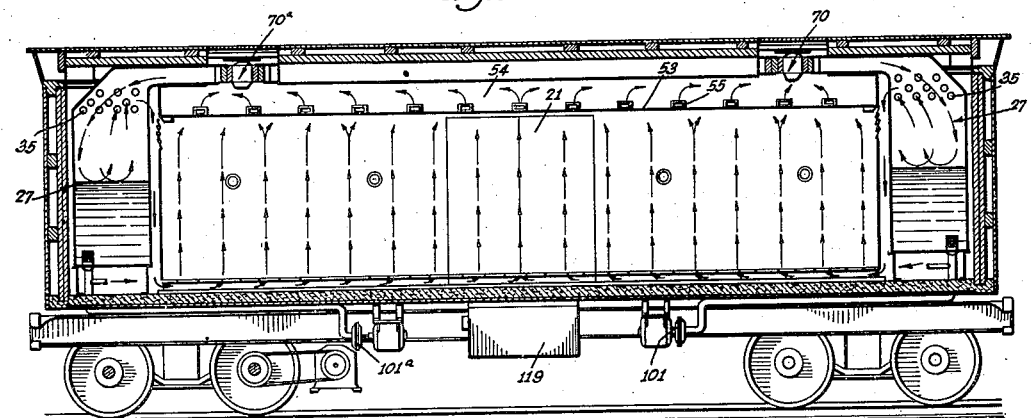
Figure 11:
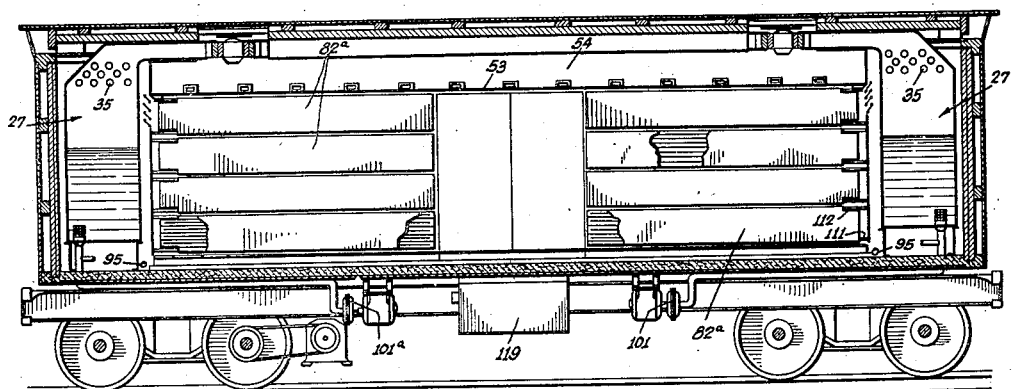
Figure 12:
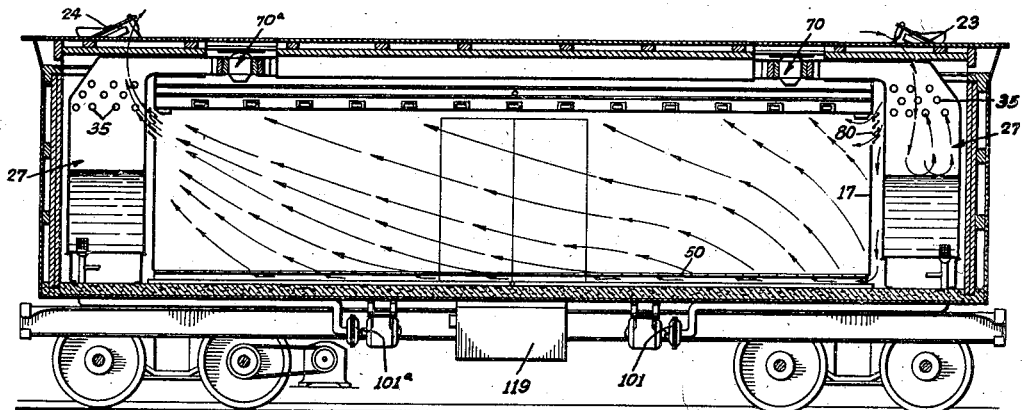
Figure 13:
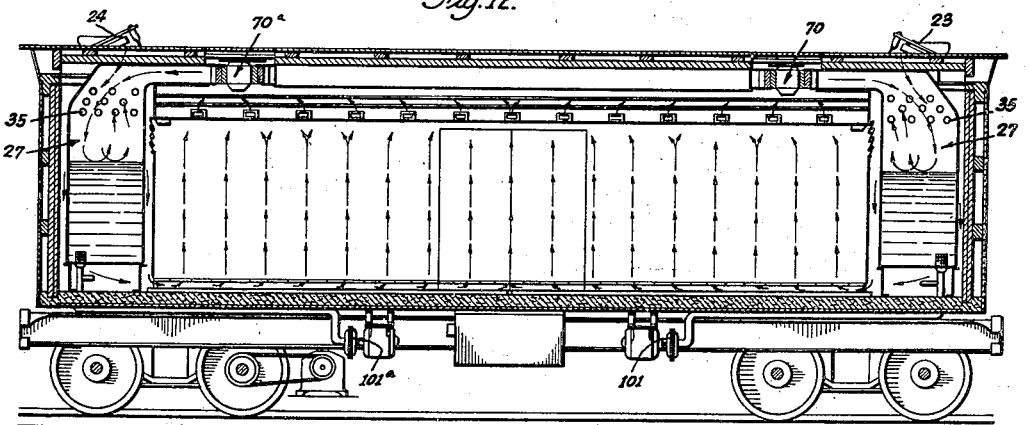
Figure 14:
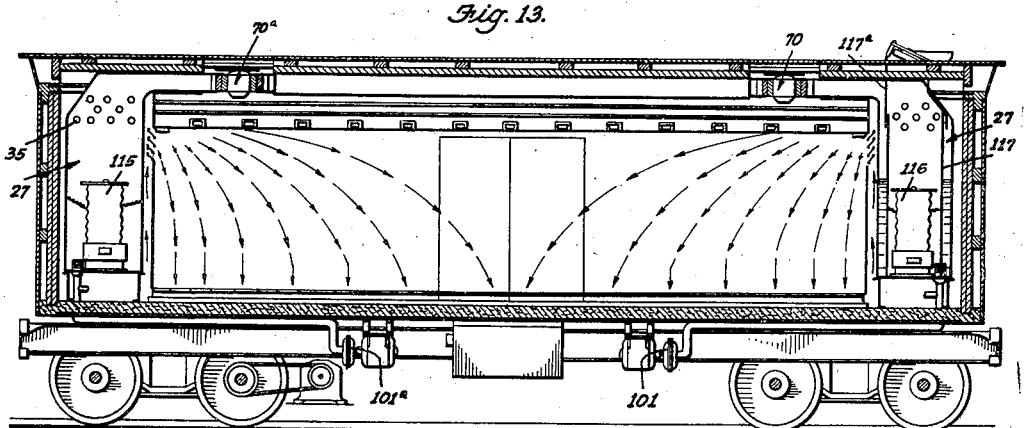

Figures 9 through 14 are diagrammatic longitudinal vertical views taken through a car such as that illustrated in Fig. 1, and when read in connection with Fig. 1 illustrate, among others, twelve possible different services to which my refrigerator car may be adapted, Fig. 9 illustrating the adaptation of my car to the employment of thermal air circulation with liquid refrigerant distributed along the floor of the car beneath the load and along the space between the false ceiling and roof of the car above the load; Fig. 10 illustrating the forced draft for air pressure circulation of air through the load; Fig. 11 illustrating the distribution of liquid refrigerant through the ceiling, floor, and side walls of the car; Fig. 12 illustrating the employment of my car for mere ventilating services; Fig. 13 illustrating the employment of my car with ventilation service and forced air circulation; and Fig. 14 illustrating the manner in which my car may be employed when the car is to be heated.

In the embodiment of the invention illustrated and described herein, I have selected the adaptation of my invention to a conventional, or standard, type of refrigerator railway car, which consists essentially in the suitable running gear, such as the trucks 1 and 2 and which has a base structure 3 upon which is supported the body of the car, including a loading floor 4 insulated as by a layer of felt, cork or other insulation 5 from an outer floor 6. From the floor 4 rises the end walls 7 and 8 of the car body, each of these end walls being usually constructed of an inner wall and an outer wall, having a dead-air space 9 therebetween. The side walls 10 and 11 of the car body are similarly constructed of double walls between which is located a dead-air space 12 which assists in insulating the walls of the car against ready heat transmission. The roof of the car is formed of an outer roof 13 and a ceiling 14 between which is an air space 15. It is usual to provide a layer of suitable insulation material 16 in the space 15 to assist in insulating the roof of the car. Spaced inwardly from the end walls of the car are a pair of bulkheads 17 and 18, one at each end of the car, the space between the bulkheads and the adjacent end of the car constituting a bunker space 19 in which bunkers may be located for the reception of ice or other refrigeration apparatus, or for the reception of heating apparatus for maintaining the car at a desired temperature. As will be understood by those skilled in the art, in refrigerator car construction the bulkheads terminate similarly, as indicated at 20, a short distance above the loading floor 4 and also terminate below the ceiling 14 so as to provide openings through which air may circulate from the loading space in the car (which lies between the loading floor 4 and the ceiling 14, and between the bulkheads 17 and 18), up over the bulkheads down through the bunker space and past the heating or refrigeration apparatus therein, and thence through the space 20 back to the loading space within the car. I have designated the loading space in the car by the reference character 21.

The roof of the car is usually provided along its longitudinal center with a walkway 22, along which employees handling the car may travel, and at each end of the car immediately above the bunker spaces 19 are a pair of hatches or openings 23 and 24 through which ice or other refrigerant may be introduced into the bunker space or through which heaters or other heating apparatus may be inserted into the bunker space.

I employ all of these features of the construction of the standard refrigerator car and add thereto new apparatus hereinafter described, which adapts the standard refrigerator car to the various classes of services including pre-cooling and maintaining definite temperatures within the car and distribution of the refrigeration effects in the car to maintain desired temperatures throughout the entire load located within the loading space 21.

It will be understood by those skilled in the art that the normal loading of the loading space 21 in a refrigerator car extends from the loading floor to a height or level of the upper edges of the doors 25 and 26 in the side walls of the car, it being unusual to load a car higher than this level since it is desirable that a space be left above the surface of the load, insuring free air circulation over the top of the load on its return to the bunker space 19.

As one of the major additions to the standard refrigerator cars, I provide a new and improved bunker 27, illustrated in detail particularly in Fig. 5 as a box or tank of substantially rectangular cross section adapted to substantially fill the horizontal cross sectional area of the bunker space 19, though it will be understood that the length and width of the bunker 27 is slightly less than the cross sectional area of the bunker space 19 in order to permit free passage of air between the outer surface of the bunker, and walls of the car, and the bulkhead 17. The height of the bunker 27 is preferably slightly less than the space between the loading floor 4 and the roof 13 so that when the bunker 27 is in place it will rest upon a pair of supporting angle members 28 and 29—(see Fig. 1)—insuring a relatively large space below the bunker 27 for the passage of air thereunder.

By referring particularly to Fig. 5, it will be observed that the bunker 27 is preferably constructed of sheet metal having a front wall 30, end walls 31 and 32, and a rear wall 33, each of the walls being formed or fabricated of one or more sheets of metal which in the process of manufacture is preferably upset to provide a plurality of vertically extending corrugations 34 which may be of any desired configuration, though I prefer that the same should be formed as indicated particularly in Figs. 2 and 5, wherein the outer faces of the corrugations are substantially flat and in which alternate corrugations extend inwardly and outwardly of the bunker. It will also be observed from an inspection of Fig. 2 that the bottom or floor of the bunker is preferably formed with corrugations similar to the corrugations 34. In this manner the effective surface area of the bunker is materially increased, thereby providing ample surface area over which air may pass to receive heat or refrigeration from the interior of the bunker as it passes through the bunker space 19.

By referring particularly to Fig. 5, it will be observed that the front, back and end walls of the bunker are imperforate throughout the major portion of their height so that the bunker is adapted to receive ice, ice and water, ice and salt, or any other liquid refrigerant which may be desired. Further, the bunker is adapted to be filled, or partially filled, with water or other liquid within which suitable refrigeration or heating apparatus may be immersed to heat or refrigerate the bunker and the air passing over the exterior of the bunker will be properly regulated as to temperature.

In order to permit the air to pass directly into the bunker and to come into intimate contact with the refrigeration or heating apparatus contained within the bunker, and to be distributed over the entire surface of the bunker, I provide a plurality of openings or perforations 35, in all of the walls of the bunker, near the upper ends thereof. Thus air which is circulated over and under the bulkheads may enter the perforations 35 and pass into intimate contact with the ice, brine or other refrigerant or heating apparatus or materials which may be contained within the bunker.

The upper ends of the front, rear and end walls of the bunker are preferably bent inwardly to fit the contours of the upper end of the bunker space 19. For example, the rear wall 33 is preferably bent inwardly to clear the upper corner structure at the junction of the end wall and roof of the car structure, while the front wall and end walls preferably are bent inwardly to join upstanding collars 36 and 37 near the opposite ends of the bunker, each of which collars abuts the opening through the roof by which access is obtained to the bunker space through the hatches 23 and 24. I prefer that the collar 36 make a substantially intimate fit with the hatches 23 or other hatchway structures in order that refrigeration material passed into the bunkers through the hatchways will be able to enter the bunkers and not to spill out upon the exterior of the bunker.

The space at the top of the bunker between the collars 36 and 37 is preferably formed as an air duct 38 of which the lower wall 39 is preferably formed by a forwardly bent portion or extension of the front wall 30 and the top wall 40, being preferably formed of a forwardly extending extension of the rear wall 33. The sides 41 and 42 of the duct may be formed by inserting any suitable shaped sheets of metal between the top and bottom walls 39 and 40.

It will also be observed from an inspection of Fig. 5 that the front wall 30 of the bunker has its corrugations 34 interrupted at a plurality of points along the face of the bunker, as indicated at 43, to accommodate the vertically extending I-beams or other vertical structures 44 by which the bulkheads 17 and 18 are held erect and in proper position within the body of the car.

With the construction thus far described, it will be apparent that my improved bunker will permit of the employment of ice, ice and water, ice and salt, cooled brine, or other refrigerant or heating media or apparatus, and that the air circulation within the car is steady, the same as that in the ordinary standard car construction, with the additional advantage that the refrigeration is contained within a solid wall bunker structure which has a relatively large surface area so that the air passage over the exterior or interior of the bunker will come into intimate contact with cold surfaces, the area of which is considerably greater than the areas which are presented to the air in the present construction of the bunkers.

As will be understood by those skilled in the art, the usual construction of bunkers is merely a wire basket, or cage, in which cracked or broken ice is dumped, the cracking of the ice being intended to increase the surface area presented to the air as it passes through the bunker. However, after the bunkers are filled and the air starts its circulation through and over the ice, the ice will melt into a substantially solid mass so that only the exterior surface of the bulk of the ice will be effective for any cooling purposes. With the improved bunker construction as described herein, the melting or solidifying of the ice mass will not in any way vary the amount of surface area over which the air may pass, and hence a substantially constant refrigeration of the air will occur throughout the entire time there is any ice within the bunker. With the construction of the bunker thus far described, it will be apparent that as ice in the bunker melts the liquid level therein will rise and due to the motion of the car some of this liquid will spill out through the openings or perforations 35, thus insuring that both the exterior and interior walls of the bunker will be wet, providing a more effective surface for heat exchange. However, the amount of moisture which will be so spilled will be due to the splash within the bunker and by employing the imperforate walls up to a relatively great height I am enabled to retain the liquid within the bunker as the ice melts and thus avoid the continuous dripping of the liquid from the car. This is of importance when salt brine or other corrosive liquid is used as a part of the refrigerant media, which, if allowed to drip along the roadbed, would cause considerable difficulty, due to the corrosion of the rails, electric bonds of the rails, or would make the ballast sufficiently conductive to short-circuit or disable the signal apparatus employed on the road. It will be understood also that at all icing stations where the ice is to be replenished, the bunkers may be drained of sufficient liquid to maintain the liquid level below the perforations 35 therein.

Floor racks

Figure 6:
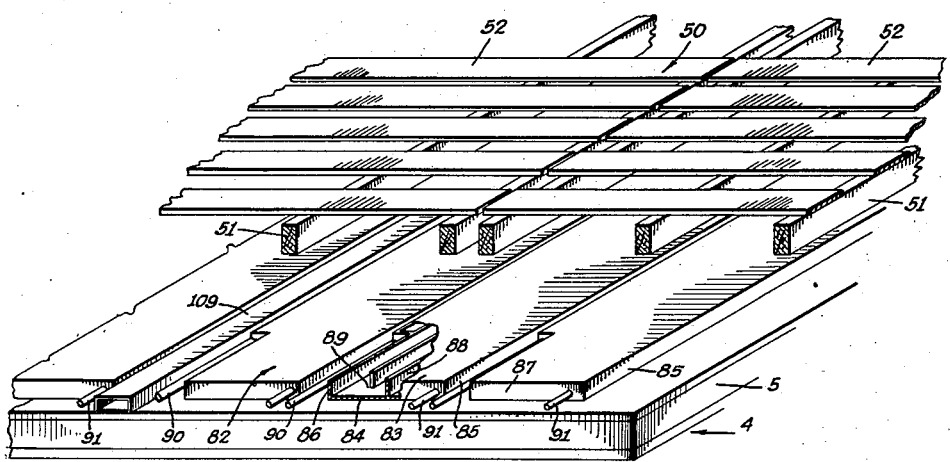
Fig. 6 is a fragmentary, perspective view of the arrangement of the floor of the car, liquid refrigeration or heating coils or radiators and floor racks employed in my invention.

As will be understood by those skilled in the art, it is the common practice in loading various types of produce in a refrigerator car of the character herein described, to load certain types of these produce directly upon the loading floor 4, while other types of produce, such as fruits and vegetables, are loaded upon floor racks 50 which rest upon the loading floor 4 and which are constructed as is illustrated particularly in Fig. 6 of a plurality of runners 51, usually in the form of 2" x 4" strips of wood extending longitudinally of the body of the car and to which is secured a plurality of strips or slats 42 to form, with runners 51, a substantial grating, covering the entire floor area. By the use of floor racks the load in the car is elevated a short distance above the main or loading floor 4 of the car, thus providing an air passage beneath the load through which air from the bunker space 19 may pass directly under the load and thence seep upwardly through the load to the ceiling of the car whence the air returns to the top of the bunker and passes down over the bunker. It will be observed that the lower edge of the bulkheads 17 and 18 terminate substantially level with the upper surface of the floor racks 50 so that the air which passes over and beneath the bulkheads 17 and 18 will be readily admitted into the space between the load and the loading floor 4.

In Fig. 1 I have illustrated, by a series of arrows, the normal circulation of air from the bunkers through the load when thermal circulation is depended upon for the circulation of air over the bunkers through the load. It will be observed that the major portion of the air passing down around the bunker 27, and being cooled thereby, will enter the space between the loading floor 4 and the load and will pass thereunder and immediately rise to the load, where it will be warmed and rise to the ceiling and thence pass over the top of the bulkhead 17 back to the bunker. Thus the major portion of this air will pass through that part of the load which is next to the bulkheads 17 and 18, while little, or none, of the cold air will pass to the center of the car or to the load located therein.

I achieve a more even distribution of the cooled air through the load by constructing the floor racks as indicated in Figs. 1 and 2, wherein the slats 52 adjacent the bulkheads 17 and 18 are spaced very close together, while the spacing between the slats greatly increases as they approach the center of the car. Thus a comparatively small air space is provided for the passage of the air upwardly through the load near the bunker, and a larger space is provided near the center of the load and hence there will be a greater tendency for the cold air to pass toward the center of the car before it rises through the load. In this way I achieve a greater cooling of the entire load of the car, though it will be observed that the path taken by air from the central portion of the loading space 21 is at a considerable angle to the vertical as it returns to the top of the bulkheads 17 and 18, leaving a substantially V-shaped space in the car which receives only a minor amount of refrigeration.

False ceiling and forced air circulation

Figure 7:
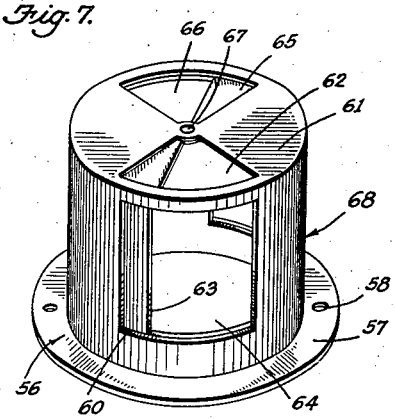
Fig. 7 is a perspective view of an air circulation regulator which may be employed in the false ceiling illustrated in Figs. 1, 2 and 3.
Figure 8:
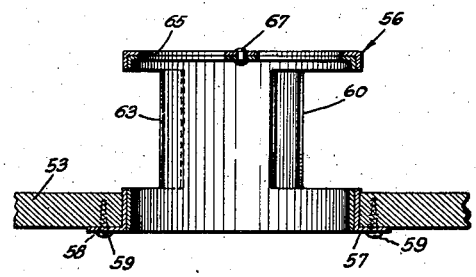
Fig. 8 is a detailed vertical sectional view taken through a portion of the false ceiling and through the air circulating regulator illustrated in Fig. 7.

In order to more evenly distribute the refrigerated air throughout the entire load, I provide a false ceiling 53 in the car spaced a considerable distance below the true ceiling 14 of the car. Preferably the location of the false ceiling 53 is such that it is but a slight distance above the top of the doors 25 and 26, thus providing a space 54 between the false ceiling and the true ceiling, which comprises an air passage or air duct through which air may readily pass from the upper portions of the car toward the bunkers at either end thereof. The false ceiling 53 is preferably formed of relatively thin but solid sheet material and is provided with a plurality of openings 55 therethrough. The openings 55 may be distributed evenly throughout the surface of the false ceiling 53 or may be grouped in much the same manner as the spacing of the slats 52 of the floor racks is arranged; that is, a greater number of openings of greater area may be provided near the center portion of the loading space of the car and the areas of the openings may be reduced as they approach the bulkheads 17 and 17 at either end of the car. However, I prefer to evenly distribute the openings 55 and to provide in each of these openings an air passage regulator, such as that illustrated in Figs. 7 and 8, which consists essentially of an inverted cup-shaped shell 56, the opening of which is provided with a radial flange 57 having one or more holes 58 therethrough by which the shell may be secured to the false ceiling 53 in the openings 55 as by means of screws 59. The side walls of the shell 56 are formed with a plurality of relatively large openings 60 extending therethrough while the top 61 of the shell is also preferably provided with one or more relatively large openings 62. Nested within the shell 56 is a second cup-like member or regulator 63, which, like the shell 56, has upon its side walls a plurality of relatively large openings 64 coinciding in dimensions with the openings 60 in the shell 56 and likewise the top 65 of the regulator member 63 may be provided with a plurality of openings 66 similar to the openings 62 in the top of the shell 56. The regulator member 63 is preferably pivoted as at 67 to the center of the top 61 of the shell 56, so that it may be rotated relative to the shell 56. The assembly 56—67 may be termed "an orifice regulator", by which the effective air passage through the openings 55 may be regulated or determined in order to properly control the rate of movement of air through each of the openings 55. That is, by changing the relative positions of the openings 64 and 66 with respect to the openings 60 and 62 of the shell 56, the effective area for the passage of air through the openings 55 may be varied. In this manner, while all of the openings 55 may be of the same dimensions and may be distributed evenly throughout the false ceiling 53, the passage of air through the openings 55 may be carefully regulated so as to achieve the desired air distribution therethrough for the purpose hereinafter described.

The air passage 54 communicates with the bunker 27 by means of the air duct 38, the air duct 38 extending over the top of the bulkheads 17 and 18 toward the loading space 21 of the car and the duct 38 joining or being constructed to form an integral part of the outlet 69 of a fan or blower 70.

The fan or blower 70 is illustrated diagrammatically in Figs. 1 and 2, as including a rotatable rotor 71 having a plurality of fins or blades 72 operating within a shell or housing 73, the center lower surface of which has a relatively large air inlet opening 74 through which air may be drawn into the rotor and driven outwardly by the blades thereof through the outlet 69. I have illustrated the fan herein as being driven by electric power, the particular type of fan selected for illustration including a stationary armature 75 secured upon a base 76 insertable through a suitable opening 77 in the roof of the car, while the rotor 71 constitutes a rotating field rotatable about the stationary armature 75.

It will be observed from an inspection of Figs. 1 and 2 that by this construction the fan may be constructed of relatively large diameter and may also be of relatively low height, thus accommodating this fan for insertion in the space 15 between the roof 13 of the car and the true ceiling 14 thereof. Thus the fan, while adapted for a relatively large capacity for moving air, is at the same time adapted to occupy only that space in the refrigerator car constituting the waste or dead air space 15 and hence does not in any way interfere with the effective loading volume of the loading space 21.

The inlet opening 74 of the fan is preferably disposed over a suitable opening 78 in the true ceiling 14 of the car so as to communicate directly with the air space 54 between the false ceiling 53 and the true ceiling 14.

As will be observed from an inspection of Figs. 1 and 2, a fan 70a, of similar construction, is located at the opposite end of the car and that each of the bulkheads 17 and 18 preferably terminates at a point spaced a considerable distance below the level of the false ceiling 53 to provide air passages leading to the bunker space 19 independent of the air space 54 above the false ceiling. It will also be observed that the space between the upper edges of the bulkheads 17 and 18 are provided with movable shutters 80 by which the space between the upper edges of the bulkheads and the false ceiling 53 may be opened or closed at will. The shutters 80 are preferably pivoted relative to each other and are arranged to be moved from the position shown in Fig. 1—(when the shutters are opened)—to the position shown in Fig. 10—(when the shutters are closed)—by means of a suitable power mechanism 81 illustrated as an electrically operated solenoid. I prefer to connect the solenoid 81 in the same electric circuit with the fan 70 so that whenever the fan 70 is operated the shutters 80 will be closed.

Thus when the fan is operating the air in the car will be circulated by forced draft from the air space or passage 54 through the fan 70 to the duct 38 leading to the interior of the associated bunker 27, at which point the air will be brought into contact with the ice, liquid, or other refrigerant, or heating material in the bunkers 27, and thence will pass out of the openings 35 in the walls of the bunker and downwardly around the outside walls of the bunker to the bottom of the bulkhead 17. Thus the air will pass through the space beneath the floor racks 50 toward the center of the car, portions of the air ascending through the load at various points along the length of the car and rising through the load. The openings 55 in the false ceiling 53 will permit the air to return to the air space 54 until it has again passed to the fan. By properly regulating the effective areas of the openings 55, as hereinbefore described, the air in one-half of the car will be completely circulated by the fan 70 and evenly distributed throughout the load. It will also be understood from an inspection of Figs. 1 and 2 that the fan 70a at the opposite end of the car, performs a similar function, distributing the air properly throughout that half of the car. It will also be observed that with the construction thus far described the fan 70 may be used to circulate air through the car under pressure by which the air may be accurately completely and evenly distributed throughout the car, though if it is not desired to operate the fan for any reason the shutters 80 will automatically be opened and air will be distributed through the loading space of the car by thermal circulation, substantially identical with the standard refrigerator car practice. That is, the air will circulate past the bunkers 27, through the space beneath the floor racks 50 and thus upwardly through the load and back toward the bulkheads 17 and 18, respectively, following the path of the arrows indicated in Fig. 1, the air at the top of the car then passing through the space provided by the open shutters 80 and back to the bunkers.

With the fans in operation, however, the circulation of air will be as indicated in Fig. 10, and it will be observed from an inspection of Fig. 10 that the arrows thereon, indicating the direction of movement of the air, illustrate a complete distribution of the refrigerated air throughout the entire loading space 21 within the car. As will be understood by those skilled in the art, if the air within the car is kept under a slight pressure no difficulty will be encountered in distributing the course of the air evenly throughout the entire loading space of the car. It will be observed, also, from an inspection of Fig. 10, that the air circulated through the loading space of the car now covers the complete interior of the car, there being no spaces within the car through which the air does not circulate as distinguished from the effects achieved by thermal circulation, as shown in Fig. 1, wherein the center of the car, and particularly the central upper portion thereof, constitutes a substantial dead-air space through which little or no air passes, and hence no effect of the refrigeration is achieved.

*Liquid refrigeration distribution*

By reason of the fact that the bunkers 27 are water-tight throughout the major portion of their height, I am permitted to employ liquid as a part of the refrigeration or heating material, and I am enabled to use this liquid to distribute refrigeration or heating more intimately with the load.

I prefer to provide along the loading floor 4 of the car a plurality of metal ducts or pans 82 which, as illustrated particularly in Fig. 6, may be constructed as shallow pans having a top wall 83 and a bottom wall 84, side walls 85 and 86 and end walls 87 to completely enclose the space within the ducts or pans 82. On the interior of these pans 82 I provide a plurality of partitions 88 extending longitudinally thereof, alternate partitions being spaced as indicated at 89 from the end wall of the pans 82 so that liquid entering the pan by way of a pipe or hose 90 will pass down the length of the pan, then back the length of the pan through the tortuous path defined by the partitions 88 before it reaches the exit indicated by the pipe or hose 91. It will thus be observed that each of the pans 82 constitutes in effect a liquid circulating coil through which liquid may be forced to distribute the refrigeration or heating effects thereof throughout the area of the pan.

In order that these pans shall not occupy any appreciable amount of the loading space within the car, I prefer to form them of relatively low height, for example, not more than two inches, and in order to facilitate their insertion into and removal from the car, I prefer to limit their length to approximately one-half of the length of the loading space within the car as well as to construct each of the pans of relatively narrow dimensions and to use a plurality of them to cover the lateral floor space of the car whereby any one of the pans or units may be readily removed or replaced without disturbing the remainder of the pans.

By referring particularly to Figs. 1, 3, 4 and 5, it will be observed that I provide a header 95 extending laterally across the bunker space 19 immediately behind the bulkhead 17, and this header may be formed of a section of pipe relatively large in diameter provided with a plurality of connections 96 extending under the bulkhead 17 toward the floor pans 82. The connections 96 may be formed of rigid pipe or may be formed of flexible hose to be coupled with the pipes or hose 90 leading to the pans 82 and by which liquid from the header 95 may pass directly to the pans. I prefer to connect the pipes or hose 96 with the pipes or hose 90 by detachable connections to facilitate the replacement of any of the pans. The outlet hose or connections 91 from the pans are preferably carried under the bulkhead 17 and upwardly along the front or rear faces of the bunker 27 as indicated in Fig. 4 at 97 to terminate in nozzles 98 and communicate with the interior of the bunker 27 near its upper end.

The liquid in the bunker 27 may thus be circulated through the floor pans 82 by any suitable pump mechanism which connects with the bunker and with the header 95. Referring particularly to Figs. 1, 3 and 4 it will be observed that the bunker 27 is provided with an outlet opening 99 in the bottom thereof to which is attached a pipe 100 leading to the inlet of a liquid pump 101 preferably mounted beneath the floor of the car and adapted to be operated by any suitable power mechanism 102 illustrated herein as an electric motor. The outlet 103 of the pump 101 is connected by means of a pipe 104 with the header 95 so that the liquid pumper from the lower portion of the bunker 27 will be forced under pressure to the header 95 and from the header 95 will pass into and through the floor pans 82. The outlets 91 of the pans 82, being connected to the nozzles 98, cause the liquid discharged from the pans to be sprayed into the top of the bunker, distributing this liquid over all of the refrigeration apparatus or material which may be located within the bunker 27, this liquid passing down the interior of the bunker and accumulating in the lower portion thereof ready to be re-circulated. It will also be observed that the bunker 27, at the opposite end of the car, is similarly connected to a pump 101a to circulate liquid from the bunker at that end of the car through the floor pans 82 extending from that end of the car to the center thereof. Thus I am enabled to distribute a part of the refrigeration material in the bunker 27 directly under the load within the car so that I achieve the effect, not only of the circulation of air past the bunkers at the ends of the car, but I achieve the effect of extending the refrigeration bunkers entirely below the loading space within the car. When the bunkers alone are employed for the refrigeration or heating, it is necessary for the heat or cold to travel from the bunker to the center of the car and return, a total distance of approximately 40 feet while by employing my floor pans and circulating the liquid therethrough the total distance required for the heat or cold to travel through the load is determined only by the height of the load in the car, which seldom exceeds 5 or 6 feet. I can therefore achieve a lower temperature within the car and achieve a more even distribution of the temperature within the car by the employment of my floor pans and circulating the liquid therethrough.

The pipes 100 and 104 and the pump 101 may be placed at any suitable location upon the car and while I have illustrated the same as being exteriorly of the car, it will be understood by those skilled in the art that suitable insulation should be placed over the pipes and the pump should be enclosed in a suitably insulated housing in order to prevent undue loss of heat or cold by the passage of the liquid through these pipes and the pump. For clarity of the illustration of the pump and pipes herein, I have omitted showing the insulation about these members, though it will be understood by those skilled in the art that wherever any of the pipes or other apparatus conducting liquid refrigerant or heating media are located outside of the car, they should be properly insulated against loss of heat.

Overhead coils

By reason of the construction of my bunkers and the employment therewith of the pumps 101—101a, I can also distribute a portion of the refrigeration or heating liquid through the ceiling of the car to thereby increase the distribution of the refrigerant or heating media. I have illustrated in Figs. 1, 3 and 4 a plurality of pipes passing through the space 54 between the false ceiling 53 and the true ceiling 14 of the car. One of these pipes, 105, extends from the header 95 at the right-hand end of the car across the space 54 and terminates in a nozzle 106 at the upper end of the bunker 27 located in the opposite end of the car. Another pipe 107 extends from the header 95 at the left-hand end of the car and terminates in a nozzle 108 in the bunker 27 at the right-hand end of the car. Thus the pump 101 will force liquid from the bunker 27 at the right-hand end of the car through the pipe 105 and discharge the same into the bunker 27 at the opposite end of the car, while the pump 101a will similarly pump liquid from the bunker 27 at the left-hand end of the car and discharge it into the bunker at the opposite end of the car.

By reason of discharging the liquid into the bunker at the opposite end of the car, I am enabled to maintain the condition of the refrigerant at both ends of the car equal and at substantially the same level in both ends of the car. I also prefer to interconnect the bunkers 27 at opposite ends of the car by means of an equalizing pipe or duct 109 which preferably leads from an outlet pipe 100—(the same pipe which leads to the respective pumps)—from the bunker at one end of the car and connects to the outlet pipe 100 for the bunker at the opposite end of the car, the equalizing pipe 109 being preferably flattened out or formed as a relatively shallow tube of rectangular cross-section conforming in height with the height of the floor pans 82, as is indicated in Figs. 1 and 6.

By reason of the interconnection of the two bunkers through the equalizing pipe 109 and the alternate connections of the ceiling pipes 105, 107, I compensate for possible errors in the icing or heating of the bunkers at opposite ends of the car. For example, the car may be brought into an icing station and by reason of negligence of one of the employees, one of the bunkers may be filled with ice and the other may not. By circulating the liquid from one of the bunkers to the other, I achieve the effect of distributing the refrigeration in the car to both ends of the car and thus prevent possible spoilage of the produce by reason of negligence of the employees taking care of the car. Thus interconnection of the bunkers at the opposite ends of the car also compensates for the possible breakdown of one of the pumps 101 or 101a, since if one of these pumps should stop for any reason the other pump will circulate the liquid from both bunkers through at least a portion of the ceiling coils of the car and thus assist in maintaining the temperature more nearly even throughout the car in spite of such failure.

*Application of apparatus to various services*

A transporting vehicle for perishable products constructed in accordance with the foregoing description, is adapted for substantially all classes of refrigeration, heating or ventilation services required for the successful transportation of any perishable products without change or alteration in the construction and equipment of the vehicle. In Figs. 1 and 9 through 14, I have illustrated the adaptation of my vehicle to substantially all of the conditions and requirements to be met in such service.

*Standard refrigeration*

A car equipped in accordance with my invention is adapted to perform all of the services of a standard refrigeration car under conditions known as "standard refrigeration service". That is, my car is adapted to produce the standard refrigeration conditions now found in standard refrigerator cars, which consists essentially of the mere maintaining of refrigeration material in bunkers at opposite ends of the car and dependence upon thermal circulation of air throughout the loading space of the car to perform the desired service. Such standard refrigeration service is illustrated particularly in Fig. 1, wherein I have illustrated the thermal circulation of air throughout the car in the same manner as is now performed by the standard refrigerator car. I employ my new bunker adapted to receive ice, and ice and water, ice and salt, or cooled brine, in the same manner as the ice bunkers of the standard refrigerator cars may be iced, or may be filled with ice and salt, or, in the case of meat cars, filled with brine. The bulkheads 17 and 18 with the open shutters 80 provide air passages at the tops and bottoms of the bulkheads for the normal thermal circulation of the air; that is, the air will pass down the exterior of the bunker and a portion of the air will also pass into the interior of the bunker through the openings 35 and thence will pass out from those openings 35 and down to the bottom of the bulkheads 17 and 18. The air passing under the bulkheads 17 and 18 will then pass along the floor of the car in the space below the floor racks 50 and then pass up through the load in the direction of the arrows indicated on Fig. 1, back to the top of the bulkheads and through the shutters 80 to return to the bunker.

I do, however, achieve a better refrigeration even with the normal thermal circulation than is now possible to achieve with the standard types of railway cars, in that I employ my improved type of bunker which is adapted for any desired refrigerant, to reduce the temperature thereof to the desired extent. Also, by employing my type of bunker, I achieve a greater surface area exposed to the passage of the air by thermal circulation than is possible with open bunkers employing block ice or cracked ice. Further, it will be noted that the motion of the car while in transit will cause at least a portion of the water or other liquid refrigerant in the car to splash within the bunker and a portion of this liquid will pass out throught the openings 35, wetting the surface of both the interior and exterior of the bunker and increasing its heat exchange value.

Further, by employing my new type of floor rack in which the spaces between the slats are graduated toward the center of the car, I restrict the amount of cold air which passes up through the load immediately adjacent the bunker and require a greater portion of the cold air to travel toward the center of the car, thereby achieving a better and more even distribution of the refrigeration throughout the car than is possible with present-day practices.

*Thermal circulation with distributed refrigerant*

With the same equipment described herein, I can provide a service which will maintain the temperature within the car at a lower value than is possible to achieve with a standard refrigerator car and thermal circulation by distributing a portion of the refrigerating material along the floor or along the ceiling, or both, and I have illustrated such service in Fig. 9 wherein I have illustrated my improved type of bunker and have illustrated my pumps in operation to circulate liquid from the bunkers through the floor pans and through the ceiling coils or pipes.

From an inspection of Fig. 9, it will be observed that by reason of the distribution of the refrigerant through the floor coils, I achieve a lower temperature in the air which passes immediately along the floor so that when this air starts to rise through the load it is at a lower temperature than possible without the employment of the floor pans. Further, the use of the floor pans maintains the air at a substantially constant temperature throughout its passage along the floor of the car so that as the air starts to rise through the load it is at a substantially constant temperature throughout the entire length of the car. Thus while thermal circulation is depended upon for circulating the air past the bunkers and through the load, I maintain a more even distribution of the temperature throught the entire load since the maximum distance through which the air must travel when the floor coils are alone in operation is the height of the load; namely, from 5 to 6 feet, as distinguished from the distance of 20 feet, the air must travel after it has left the cooling effects of the bunker when the floor coils are not used. Also, when the ceiling coils are also used in conjunction with the floor coils, the maximum distance through which the refrigerant must penetrate into the load is merely one-half the height of the car, not more than 4 feet, and I therefore distribute the refrigerant more evenly through the entire load.

The arrows in Fig. 9 illustrate the passage of the air from the bunkers along the floor and up through the load and back through the shutters 80—(which are open under these conditions)— and back to the bunker while the ceiling coils or pipes 105 and 107 cool the ceiling of the car, thereby causing a cooling of the air as it rises to the ceiling and a down draft of this cold air is indicated in the arrows leading from the false ceiling 53 of the car shown in Fig. 9. By reason of this arrangement, I am enabled to eliminate that dead-air space or hot space at the center and upper center of the load and achieve a much more even temperature throughout the load.

Forced air circulation

In Fig. 10 I have illustrated the adaptation of my construction to the refrigeration of a car using forced air circulation by means of the fans 70. When the fans are employed the air within the car is placed under a slight pressure, so that the air passes directly from the floor racks of the car in substantially vertical lines to the false ceiling 53 of the car, as indicated by the arrows on Fig. 10, and thence the air is carried through the air passage 54 through the fans and down around and into the bunkers. The forced circulation of the air to the regulator openings 55 in the false ceiling 53, enables me to evenly distribute the refrigeration throughout the entire load independent of whether or not the ceiling coils and floor pans are used to distribute the refrigerant liquid.

The type of service illustrated in Fig. 10 is particularly adapted for the transportation of fruits and certain types of vegetables. For example, in the distribution of citrus fruit it is desirable that the car and load should be precooled, that is, reduced to a relatively low temperature before the cars start upon their journey. By the employment of my system in the type of service illustrated in Fig. 10, I eliminate the necessity of pre-cooling the car and load since all that is necessary is to fill the bunkers 27 at opposite ends of the car with the desired refrigerant and the circulation of air by the fan will cool the car and load down, while it is in transit, and will cool the car and load to any desired temperature, depending upon the type of refrigerant used. I am therefore enabled to immediately start the car upon its journey as soon as it has received its load, thereby eliminating the delay and tying up rolling stock which is now necessary in order to obtain pre-cooling service. It will be understood by those skilled in the art that the pre-cooling of the car and load in accordance with the present practice, requires the forced circulation of air at a relatively low temperature through the car until the entire load is cooled down to a predetermined value and this is accomplished either by the filling of the ice bunker and circulating the air by the addition of fans, or other apparatus temporarily installed within the car, or by the connection of the car to pre-cooling stations, where low temperature air is forced through the car prior to the icing of the bunkers.

It will therefore be observed from an inspection of Fig. 10 that I achieve all of the effects of either of these types of pre-cooling the car and load without the necessity of installing any temporary apparatus which must be removed, or without the necessity of delaying the car at a pre-cooling station.

It will also be observed from an inspection of Fig. 10, that by operating the pumps 101—101a at the same time that the fans are operating, I can produce a still further improved cooling service by distributing the refrigerant liquid into intimate contact with the load, while at the same time I force the air through the load under pressure.

Distribution of refrigerant through the load

By referring particularly to Fig. 11, it will be observed that I have illustrated a still further service which may be accomplished by my refrigerated vehicle construction, wherein a plurality of pans 82a, corresponding to my construction of the floor pans 82, theretofore described, may be mounted upon the side walls of the car and connected to the header 95 and bunkers 27 in the same manner as described for the connections of my floor coils 82.

By referring particularly to Fig. 4, it will be observed also that the header 95 is provided with a plurality of detachable connections 110 to which may be connected flexible pipes or hose 111 leading through the bulkhead 17, as indicated particularly in Fig. 3, which hose or other flexible connections may be coupled to the pans 82a and secured to the side walls of the car. I prefer to provide the wall pans 82a of such length as to extend substantially from the bulkheads to the doorways 25 and 26 of the car, leaving the doorway space clear for access to the interior of the car, though it will be understood by those skilled in the art that I can employ said wall pans 82a of any desired dimension. The return lines 112 from the coils pass back through the bulkheads and terminate in nozzles at the upper ends of the bunkers, similar to the nozzles 98 and 108 described for the floor pans and ceiling coils, so as to return the liquid refrigerant in the form of a spray at the upper ends of the bunkers.

In the construction of the car it may be found desirable to extend the pipes or hose 111—112 to and through the bulkheads 17 and 18 and place detachable connectors therefor upon the outer face of the bulkheads to permit the ready attachment and detachment of the side wall coils 82a.

It will also be noted from an inspection of Fig. 3 that a plurality of additional hose connections are provided upon the face of the bulkhead 17 distributed in lines spaced from the side walls of the car. Such hose connections may include connections 113 and 114 to which additional side wall pans 82a may be attached for extension in between portions of the load of the car, as by providing any suitable mechanism for supporting the side wall pans within the interior of the car and connecting their inlets to the connections 113 and their outlets to connections 114. It will also be understood that the connections 113 will communicate with the header 95 while the return connections 114 will be connected by suitable hose or pipe to nozzles similar to 108 in the upper ends of the bunker.

*Ventilation*

The car constructed in accordance with my invention is equally adapted to the standard ventilation service employed in connection with standard refrigerator cars. In the standard ventilation service the hatches 23 and 24 at opposite ends of the car are raised to an angular position, such as that illustrated in Figs. 12 and 13, so that the motion of the car in one direction will cause air to be drawn in through the hatch 23 down through the bunkers 27 and then through the openings 35 therein to the exterior of the bunker, where the air divides and part of it passes through the open shutter 80 and in the direction indicated by the arrows to the opposite end of the car through the shutters 80 at that end of the car, and then outwardly through the hatch 24 at that end of the car, while a portion of the air will also pass down behind the bulkhead 17 and along the space below the floor racks 50 and up through the load of the car, as indicated by the arrows appearing on Fig. 13. In Fig. 13 I have illustrated ventilation service similar to that in Fig. 12, except that with my fans 70 in operation the air entering the car through the hatchway 23 by reason of the motion of the car is additionally circulated by the fans in accordance with the arrows indicated on Fig. 13. With this type of service, I achieve a better ventilation than is possible by mere dependence upon the effect of the car moving along the track or roadway. Further, it will be observed that by employing the fans I can maintain a circulation of air through the car independently of whether the car is moving or standing, and thus tend to maintain the atmospheric conditions in the car independent of the movement of the car.

*Heating service*

During the winter months it is necessary to provide heat within the cars carrying perishable products, in order to prevent freezing thereof and in the standard refrigerator car practice heaters 115 are inserted in the bunker space 19, the construction and operation of these heaters being old and wellknown in the art. Such heaters are constructed in such dimensions that they may be readily lowered through the hatches 23 and 24 and set upon the floor of the ice cage employed within the bunker space.

From an inspection of Fig. 14, it will be observed that my improved type of bunker and opening of the hatchways 23 and 24 is equally adapted for the reception of standard types of heaters 115. Again, in the heating of the car, thermal circulation has heretofore been depended upon, and my car is eqally adapted to the thermal circulation of the heat, or, if desired, to provide a better and more even distribution of the heat throughout the car, my fan 70 may be started into operation and the heat distributed throughout the car by forced air circulation, the lines taken by the warm air corresponding exactly to the direction of air indicated by the arrows in Fig. 10.

While it is the present practice to merely employ a heater in the bunker space and depend upon the air heated around the heater as the source of heat to be circulated through the car, I am enabled by the construction of my improved bunker to materially increase the amount of heated area presented to the air, since by locating a heater within my bunker the entire metal surface of the bunker will become heated and due to its relatively large area as compared with the area of the heater 115, will permit a greater quantity of heat to be absorbed by the air as it passes over the surface of the bunker. Further, my improved type of bunker, being water-tight, permits the use of a hot water, or other liquid, heating system which I have illustrated particularly in Fig. 14 at the right-hand end of the car, as including a heater 116 identical in all respects to the heater 115 but which is inserted in a tank or water-tight vessel 117 which is in turn placed within the bunker 27. The space within the bunker between the tank or vessel 117 and the walls of the bunker may then be filled with water or other liquid and the heat from the heater 116 transmitted to the water or other liquid, which is in turn transmitted by the liquid to the surface walls of the bunker where it is taken up by the air circulating through the car.

It will also be observed that by the employment of my improved bunker, and particularly by using the heater 116 in its vessel 117, that I heat the liquid in the bunker and am enabled to use my pump system for circulating hot liquid through the pans 82, side wall pans 82a— (if desired)—and through the ceiling coils 105 and 107 in the same manner as described for the circulation of refrigeration liquid hereinbefore set forth. In this manner I am enabled to distribute the heating material within the car and into intimate relation with the load in the same manner as I have been enabled to distribute the refrigeration liquid.

It will also be understood that if desired the fans 70 may be employed in the distribution of the hot air to circulate the air through the space 57 around the bunkers, along the floor and up through the load in the same manner as described with reference to the forced distribution of air for refrigeration and as illustrated in Fig. 10.

It will be noted that by the use of my improved type of bunker which is imperforate throughout the major portion of its height, the fire hazard now encountered in the placing of heaters in the open or grid types of bunkers is eliminated since any spilling of fire from the heaters 115 would be to deposit the same within the metal bunker 27 without possibility of the same contacting any of the wood or other imflammable portions of the car.

It will also be noted from an inspection of Fig. 14 that by using the auxiliary vessel 117a to contain the heater such auxiliary vessel may be provided with a cover member 117a which may be suitably formed, as indicated in Fig. 14, to fit immediately within the hatchway opening 23 permitting the complete venting of all products of combustion and preventing noxious or toxic gases from being passed from the heaters to the loading space in the car.

*Mechanical refrigeration*

Also by using my improved water-tight type of bunker, I can employ any of the wellknown mechanical refrigeration mechanisms by inserting such systems or apparatus into a jacket or vessel, such as 117, in place of the heater 116 illustrated herein in Fig. 14, and surrounding the vessel 117 with water, brine, or other refrigerant liquid to transmit the refrigeration from the mechanical apparatus to the surfaces of the bunker and through the floor coils, ceiling coils, or other distributing apparatus hereinbefore described. It will also be observed that by the employment of the vessel 117 in the bunker 27, I am enabled to use solid or liquid carbon dioxide as a refrigerant by locating within the vessel 117 such expansion apparatus as is well known in the art for the purpose of receiving and expanding carbon dioxide in either liquid or solid form.

Humidity control

It will also be observed that by the employment of my new bunker construction I am enabled to control the relative humidity within the car to any desired value, as by operating the pumps 101—101a and by providing in the load space 21 a humidistat 125—(see Fig. 3)—of any wellknown design adapted to complete an electric circuit when the relative humidity reaches a predetermined value, the humidistat 125 being connected to a solenoid 126 (see Fig. 5), which controls a valve upon a pipe 127 connected to the header 95 and extending into the air duct 38 terminating therein in a spray nozzle 128. Thus by setting the humidistat 125 to any desired humidity value, the valve 129 will be turned off and on to cause the pumps 101—101a to spray water into the air duct to be picked up thereby and thus maintain the humidity at any desired value.

Gassing

It is also the practice in the shipment of certain kinds of produce, such as tomatoes, melons, etc., to inject into the car a gas which tends to either ripen or fumigate, or otherwise preserve the shipment. My car construction is particularly adapted to the gassing of the contents of the car by providing a gas opening 118 in the side wall of the car, preferably immediately above the door and communicating with the interior of the car in the space 54 between the false ceiling 53 and the true ceiling 14. Thus gas may be admitted into this space and be picked up by my fans 70 and distributed throughout the car with the assurance that the gas will be evenly distributed throughout the loading space of the car and that the concentration of the gas within the car will be equal throughout the entire loading space of the car. This obviates one difficulty now encountered in the gassing of cars, where the gas is admitted to closed cars and diffusion of the gas throughout the car consumes a relatively great length of time during which the concentrated gases are brought into contact with portions of the load while other portions of the load are treated with such dilute concentrations of gas that little or no effective value is achieved thereby.

Power mechanism

I have illustrated my fan and pumps as being adapted for electrical power operation, particularly to take advantage of the usual electrical equipment found on railway cars, though it will be understood by those skilled in the art that other types of power may be employed, such as compressed air, steam or other prime movers.

By referring particularly to Figs. 1 and 9 through 14, it will be observed that I have illustrated a box 119 as secured underneath the body of the car which represents the battery box commonly employed to house electrical batteries on railway passenger cars and the like. The batteries usually employed are of the secondary type which are recharged by a generator 120 secured beneath the body of the car and coupled, as by a belt 121, to a pulley 122 on one of the axles 123 of the running gear of the car so that when the car is in motion the generator supplies current to the batteries contained within the box 119 and also supplies current directly to lights or other power mechanism which may be employed upon the car. A similar arrangement is illustrated in Figs. 1 and 9 to 14 for the purpose of illustrating how the present electrical apparatus used on railway cars may be adapted to supply power to my fans and pumps.

However, since freight cars, including refrigerator cars, frequently are required to stand on sidings and in railroad yards for relatively great periods of time, I prefer to supply an auxiliary power for the fans and bunkers, as by providing a suitable receptacle or electrical plug box 124, shown as being secured to the battery box 119 by which electrical current may be supplied from city power lines or the station power lines, at points where the car is held for any considerable length of time, it being only necessary to plug in an electrical line to the plug connection 124 of the proper voltage for the operation of the fan motor and pump motors and all chance of any fans or pumps becoming disabled due to lack of electrical energy is obviated. It will of course be understood that if desired the generator 120 may be operated by an internal combustion engine system, or other prime movers, adapting my system to the use of electric motors for the fans and pumps but eliminating dependence upon the motion of the car as the means of supplying power thereto.

Summary

It will therefore be observed that I have provided a transporting vehicle for perishable produce wherein the vehicle is initially equipped with apparatus for providing any desired temperature or atmospheric conditions within the vehicle, and in which the vehicle has standard equipment, including apparatus for providing any desired class of service during transit of the vehicle, including mere ventilation, refrigeration with forced air circulation, refrigeration distributed in intimate association with the top, sides and bottom of the load, and interspersed throughout the load, heating with thermal circulation, heating with forced air circulation, hot water or other liquid heating with improved air circulation, distribution of hot liquid in intimate association with the load, and mechanical refrigeration.

While I have shown and described the preferred embodiment of my invention, I do not wish to be limited to any of the details of construction shown herein, except as defined in the appended claims.

I claim:

1. In a transport vehicle for perishable products, a body having a loading floor, end and side walls and roof, a bulkhead spaced from one of said walls and extending across said body to divide the interior thereof into a load receiving space and a bunker space to receive refrigerant or heating media, said loading floor having a series of openings distributed over the same, said openings being graduated in area from small openings adjacent said bulkhead to larger openings as said openings are progressively spaced from said bulkhead, a false ceiling in said vehicle spaced below said roof to provide an air passage therebetween, and a plurality of openings distributed over said false ceiling communicating between said loading space and said floor openings to permit air to pass through said loading space when passing from said floor openings to said ceiling openings, said openings graduating in area from small openings adjacent said bulkhead to larger openings as said openings are progressively spaced from said bulkhead.

2. In a transport vehicle for perishable products, a body having a loading floor, end and side walls and roof, a bulkhead spaced from one of said walls and extending across said body to divide the interior thereof into a load receiving space and a bunker space to receive refrigerant or heating media, said bulkhead being spaced from the floor and roof to provide air passages between said loading space and said bunker space, a false ceiling in said vehicle spaced below said roof to provide an air passage therebetween, said air passage communicating with said bunker space above said bulkhead, and a plurality of openings distributed over said false ceiling communicating between said loading space and said air passage to permit air to pass between said loading space and said bunker space, and a fan disposed to circulate air through said air passage and said loading space, said bulkhead terminating in spaced relation to said false ceiling to provide an auxiliary passage communicating directly between said loading space and said bunker space, and means in said auxiliary air passage for closing the same when said fan is operating.

3. In a transport vehicle for perishable products, a body having a loading floor, end and side walls and roof, a bulkhead spaced from one of said walls and extending across said body to divide the interior thereof into a load receiving space and a bunker space, and a bunker in said bunker space comprising an upstanding box-like structure having air passages through the walls thereof above a predetermined level and being water-tight below said level, adapting the same to the reception of either solid or liquid refrigerant or heating media, said bulkheads being spaced from said floor and said roof to permit thermal circulation of air between said loading space and said bunker, floor radiator means disposed above the floor area of said loading floor, and pump means connecting said bunker and said floor radiator means for circulating liquid refrigerant or heating media through said floor radiator means.

4. In a transport vehicle for perishable products, a body having a loading floor, end and side walls and roof, a bulkhead spaced from one of said walls and roof, a bulkhead spaced from one of said walls and extending across said body to divide the interior thereof into a load receiving space and a bunker space, and a bunker in said bunker space comprising an upstanding box-like structure having air passages through the walls thereof above a predetermined level and being water-tight below said level, adapting the same to the reception of either solid or liquid refrigerant or heating media, said bulkhead being spaced from said floor and said roof to permit thermal circulation of air between said loading space and said bunker, floor radiator means disposed about the floor area of said loading floor, piping connecting the inlet of said floor radiator means to said bunker near the bottom thereof, return piping connecting the outlet of said floor radiator means to said bunker near the top thereof, said return piping terminating in said bunker in spray nozzles to spray the return liquid into said bunker, and pump means for circulating liquid refrigerant or heating media between said floor radiator means and said bunker.

5. In a transport vehicle for perishable products, a body having a loading floor, end and side walls and roof, a bulkhead spaced from one of said walls and extending across said body to divide the interior thereof into a load receiving space and a bunker space, and a bunker in said bunker space comprising an upstanding box-like structure having air passages through the walls thereof above a predetermined level and being water-tight below said level, adapting the same to the reception of either solid or liquid refrigerant or heating media, said bulkhead being spaced from said floor and said roof to permit thermal circulation of air between said loading space and said bunker, and ceiling radiator means disposed about the top of said loading space and pump means for circulating liquid refrigerant or heating media between said bunker and said ceiling radiator means.

6. In a transport vehicle for perishable products, a body having a loading floor, end and side walls and roof, a bulkhead spaced from one of said walls and extending across said body to divide the interior thereof into a load receiving space and a bunker space, and a bunker in said bunker space comprising an upstanding box-like structure having air passages through the walls thereof above a predetermined level and being water-tight below said level, adapting the same to the reception of either solid or liquid refrigerant or heating media, said bulkheads being spaced from said floor and said roof to permit thermal circulation of air between said loading space and said bunker, and ceiling radiator means disposed about the top of said loading space, piping means connecting the inlet of said ceiling radiator means to the bunker near the bottom thereof, return piping means connecting the outlet of said radiator means to the bunker near the upper end thereof, and a pump for circulating liquid refrigerant or heating media through said radiator means, said return piping terminating in spray nozzles to spray return liquid into said bunker.

7. In a transport vehicle for perishable products, a body having a loading floor, end and side walls and roof, a pair of bulkheads spaced one from each end wall of said vehicle to divide the interior thereof into a loading space and a bunker space at each end thereof, a bunker in each of said bunker spaces comprising an upstanding box-like structure having air passages through the walls thereof above a predetermined level and being water-tight below said level, adapting the same to the reception of either solid or liquid refrigerant or heating media, radiator means extending into said loading space to conduct said liquid media into intimate heat exchange association with said loading space and including inlets and outlets for said liquid media, piping means connecting said inlets with one of said bunkers and piping means connecting said outlets with the other of said bunkers, and pump means for circulating said liquid media between said bunkers and said radiator means.

8. In a transport vehicle for perishable products, a body having a loading floor, end and side walls and roof, a pair of bulkheads spaced one from each end wall of said vehicle to divide the interior thereof into a loading space and a bunker space at each end thereof, a bunker in each of said bunker spaces comprising an upstanding box-like structure having air passages through the walls thereof above a predetermined level and being water-tight below said level, adapting the same to the reception of either solid or liquid refrigerant or heating media, radiator means extending into said loading space to conduct said liquid media into intimate heat exchange association with said loading space and including inlets and outlets for said liquid media, piping means connecting said inlets with one of said bunkers and piping means connecting said outlets with the other of said bunkers, and pump means for circulating said liquid media between said bunkers and said radiator means, and a conduit interconnecting said bunkers near the bottoms thereof to equalize the levels of the liquid therein.

9. In a transport vehicle for perishable products, a body having a loading floor, end and side walls and roof, a bulkhead spaced from one of said walls and extending across said body to divide the interior thereof into a load receiving space and a bunker space to receive refrigerant or heating media, said bulkhead being spaced from the floor and roof to provide air passages between said loading space and said bunker space, a false ceiling in said vehicle spaced below said roof to provide an air passage therebetween, said air passage communicating with said bunker space above said bulkhead, and a plurality of openings distributed over said false ceiling communicating between said loading space and said air passage to permit air to pass between said loading space and said bunker space, means for spraying water into the air at the point where the air enters the bunker space, and means for controlling said spray means for regulating the humidity in said loading space.

10. In a transport vehicle for perishable products, a body having a loading floor, end and side walls and roof, a bulkhead spaced from one of said walls and extending across said body to divide the interior thereof into a load receiving space and a bunker space to receive refrigerant or heating media, said bulkhead being spaced from the floor and roof to provide air passages between said loading space and said bunker space, a false ceiling in said vehicle spaced below said roof to provide an air passage therebetween, said air passage communicating with said bunker space above said bulkhead, and a plurality of openings distributed over said false ceiling communicating between said loading space and said air passage to permit air to pass between said loading space and said bunker space, and a fan disposed to circulate air through said air passage and said loading space, and a gas inlet through the wall of said vehicle communicating with the interior thereof in said air passage for admitting gas to the air stream passing therethrough.

11. In a transport vehicle for perishable products, a body having a loading floor, end and side walls and roof, a bulkhead spaced from one of said walls and extending across said body to divide the interior thereof into a load receiving space and a bunker space, and a bunker in said bunker space comprising an upstanding box-like structure having air passages through the walls thereof above a predetermined level and being water-tight below said level, adapting the same to the reception of either solid or liquid refrigerant or heating media, said bulkheads being spaced from said floor and said roof to permit thermal circulation of air between said loading space and said bunker, floor radiator means disposed above the floor area of said loading floor, and pump means between said bunker and said floor radiator means for circulating liquid refrigerant or heating media through said floor radiator means, and a plurality of piping connections on said bulkhead coupled to said bunker, whereby additional radiator means may be disposed about the loading space and connected between said bunker and said pump.

12. In a bunker for vehicles transporting perishable products, a metal box-like structure having a bottom, end walls and side walls formed of sheet material having corrugations therein to increase the effective surface area thereof, and having a plurality of perforations distributed about the walls near the upper end thereof, the remainder of said bunkers being water-tight, adapting the same to receive solid or liquid refrigerant or heating media and permitting free passage of air into and out of said bunker above the liquid level thereof, said perforations being so arranged with respect to said corrugations as to permit water to trickle through said perforations and reach said corrugations so as to be in heat exchange relation thereto.

13. In a bunker for vehicles transporting perishable products, a box-like structure having a bottom, end walls, side walls and a top section, the end walls and side walls having a multiplicity of corrugations therein to increase the effective surface area thereof, there being a multiplicity of perforations in the walls near the upper ends thereof through which liquid from within may splash to wet the exterior surface of said walls and the lower portion of said box-like structure below said perforations being water-tight, said perforations being so arranged with respect to said corrugations as to permit water to trickle through said perforations and reach said corrugations so as to be in heat exchange relation thereto.

14. In combination with a transporting vehicle for perishable products, which transporting vehicle includes a load-receiving space and a bunker space separated from the load-receiving space, of a bunker formed as a box-like structure having a bottom, end walls, side walls, and a top section adapted to be fitted within the bunker space with its walls, bottom and top section spaced from the corresponding walls of the bunker space, the vehicle having filling openings in its top section over the bunker space and the top section of the bunker being adapted to fit within said filling openings, the end walls and side walls of the bunker having a multiplicity of corrugations therein to increase the effective surface area thereof within the bunker space but exterior to the bunker, and there being a multiplicity of perforations in the walls and top portions of the bunkers near the upper ends thereof through which liquid from within the bunker may splash to wet the exterior surface of the said walls, and the lower portion of said box-like structure below said perforations being water-tight.

15. In combination with a vehicle for transporting perishable products, said vehicle including a load-receiving space and a bunker space separated by a wall from the load-receiving space, of a bunker adapted to be positioned within the bunker space with its side and end walls spaced from the walls of the bunker space, the side and end walls having a multiplicity of spaced corrugated sections to increase the effective surface area thereof, and a plurality of sections of plain surface area adapting the bunker to fit the structural elements of said vehicle, and there being a plurality of perforations in the walls of the bunker near the upper ends thereof through which liquid from within may splash to wet the exterior surface of said walls, and the lower portion of said box-like structure below said perforations being water-tight.

16. In a transport vehicle for perishable products, a body having a loading floor, end, side walls and a roof, bunker spaces at the opposed ends of the vehicle, a bunker in each of said bunker spaces, said bunkers comprising an upright box-like structure having air-passages through the walls thereof above a predetermined level and being water-tight below said level adapting the same to the reception of either solid or liquid refrigerant or heating media, the load-receiving space and bunker space being formed within the vehicle by bulkheads spaced from the floor and the roof to permit thermal circulation of air between said loading space and said bunker space, ceiling radiator means disposed about the tops of said loading space, piping means connecting the inlet of said ceiling radiator means to the bunker near the bottom thereof, return piping means connecting the outlet of said radiator means to the bunker near the upper end thereof at the end of the vehicle opposite from the end at which the inlet to the ceiling radiator is connected, and a pump for circulating liquid refrigerant or heating media through said radiator means.

FRANK A. MAGINNIS.